United States Patent [19]

Cartellone

[11] Patent Number: 4,914,777
[45] Date of Patent: Apr. 10, 1990

[54] VACUUM CLEANER BRUSH BEARING ASSEMBLY

[75] Inventor: Mark A. Cartellone, Rocky River, Ohio

[73] Assignee: The Scott Fetzer Company, Westlake, Ohio

[21] Appl. No.: 249,377

[22] Filed: Sep. 26, 1988

[51] Int. Cl.[4] .................. A46B 9/02; A46B 13/02; A47L 5/10; F16C 23/08
[52] U.S. Cl. ........................................ 15/182; 15/392; 384/208; 403/122; 403/135
[58] Field of Search .................. 15/182, 383, 392, 384, 15/389; 384/208, 209, 206, 203, 192, 210, 211, 212, 213, 214, 207; 403/122, 124, 125, 126, 131, 135, 141, 142, 143, 144, 11, 13, 14; 310/90

[56] References Cited

U.S. PATENT DOCUMENTS

| 791,086 | 5/1905 | Deutsch | 384/209 |
|---|---|---|---|
| 1,646,088 | 10/1927 | Green | 15/392 X |
| 1,965,787 | 7/1934 | Adams | 15/389 |
| 2,244,943 | 6/1941 | Dow | 15/392 |
| 3,325,849 | 6/1967 | Waters | 15/392 |
| 3,367,728 | 2/1968 | Labbie | 384/208 |
| 3,439,964 | 4/1969 | Stone et al. | 384/208 |
| 3,754,802 | 8/1973 | Keller | 384/203 |
| 4,221,019 | 9/1980 | Jager et al. | 15/392 X |
| 4,429,430 | 2/1984 | Lyman | 15/182 |
| 4,494,027 | 1/1985 | Otto | 384/208 X |

FOREIGN PATENT DOCUMENTS

| 406209 | 10/1968 | Australia | 384/206 |
| 1168213 | 10/1969 | United Kingdom | 384/206 |

Primary Examiner—Harvey C. Hornsby
Assistant Examiner—Scott J. Haugland
Attorney, Agent, or Firm—Pearne, Gordon, McCoy & Granger

[57] ABSTRACT

A self-aligning bearing structure for vacuum cleaner brushes and the like includes a plastic sleeve and a metal bearing element. The sleeve is initially formed with a flared end, allowing the bearing element to be inserted to provide a subassembly. The subassembly is then pressed axially into a cylindrical bore in the vacuum cleaner brush body. During such insertion, the flared end is deflected inwardly to produce a spherical socket which mates with a spherical periphery on the bearing element. Relative rotation between the sleeve and bearing element is prevented by a plurality of peripherally spaced teardrop-shaped projections formed on the sleeve which fit into teardrop-shaped recesses on the bearing element. The recesses are sufficiently closely spaced and are shaped in cooperation with the projections so that the recesses and projections automatically interfit upon assembly, and can therefore be assembled by automated equipment which does not require special orientation means. The interfitting projections and recesses prevent relative rotation between the sleeve and bearing element without requiring close tolerances in the manufacture of the components of the bearing.

12 Claims, 2 Drawing Sheets

VACUUM CLEANER BRUSH BEARING ASSEMBLY

BACKGROUND OF THE INVENTION

This invention relates generally to vacuum cleaners, and more particularly to a novel and improved self-aligning bearing structure particularly suited for journaling powered rug brushes of vacuum cleaners and the like.

PRIOR ART

U.S. Pat. No. 3,367,728, assigned to the assignee of the present invention, is incorporated herein in its entirety. This patent discloses a self-aligning bearing structure particularly suited for journaling a rug brush of a vacuum cleaner. Such bearing includes a molded plastic sleeve and a metal bearing that cooperate when installed to provide a spherical interface which permits limited swiveling movement of the metal bearing relative to the sleeve so that the metal bearing an align itself with the shaft on which the bearing is mounted.

The sleeve, as initially molded, provides a flared end so that the metal bearing can be assembled into the sleeve. The assembly is then pressed into the cylindrical bore in the body in which the bearing is mounted. The walls of the cylindrical bore deflect the flared end inwardly and complete the socket which defines a portion of a sphere. The metal bearing provides an outer surface which is also spherical and interfits with the socket to provide an assembled bearing structure.

This bearing provides a low-cost, self-aligning bearing which can be easily assembled and installed by automated equipment. However, if a tight fit is not provided between the installed sleeve and the metal bearing, relative rotation can occur between the bearing and the sleeve instead of the desired relative rotation between the metal bearing and the shaft. When such relative rotation occurs between the sleeve and bearing, the sleeve wears and eventually produces failure of the bearing system.

On the other hand, if the parts when assembled place too much pressure along the interface between the sleeve and the bearing, the sleeve can be damaged. Consequently, it has been necessary to form the various components of the bearing system to very close tolerances to ensure that the proper fit is provided.

Further, vacuum cleaner brushes have a wood body which can shrink and expand with changes in temperature and humidity. Therefore, it is difficult to maintain the proper fit required to prevent relative rotation between the bearing and sleeve. Even if a proper fit is initially provided, shrinkage or expansion of the wood body can result in the loss of the proper fit and ultimately cause bearing failure.

It is also known to provide a self-aligning bearing structure in which interfitting, axially extending surfaces are provided to prevent relative rotation between the bearing socket and the bearing. Such a structure is described in U.S. Pat. No. 4,494,027. In that bearing, a bearing cup or socket is provided with two diametrically opposed projections which extend into two diametrically opposed notches in the bearing element when the two parts are properly oriented. With such structure, however, the two bearing parts must be positioned in one of two positions of rotational orientation in order for the projections and notches to engage. This is particularly disadvantageous when automated assembly equipment is used to assemble and install the bearings.

SUMMARY OF THE INVENTION

The present invention provides a novel and improved, self-aligning bearing structure which is particularly suited for journaling vacuum cleaner brushes and the like, and which can be easily and reliably assembled and installed with automated equipment. Further, the present invention does not require extremely close tolerance production for reliable operation over long periods of time. Still further, a bearing in accordance with this invention continues to function properly even when the dimensions of the brush body in which the bearing is mounted change.

In the illustrated embodiment, the bearing provides a molded plastic sleeve initially formed with a flared end and a central recess sized to permit a metal bearing part to be inserted into the sleeve without interference. The sleeve and the metal bearing parts are provided with a plurality of peripherally spaced projections and recesses with interlock to prevent relative rotation between the sleeve and the metal bearing parts. These projections are shaped and positioned so that they automatically interlock when the metal body parts are inserted in the sleeve to form a bearing subassembly.

Final installation is accomplished by merely pressing the subassembly into the bore of the brush body. When the subassembly is pressed into the brush body, the flared end of the sleeve is deflected radially inward to form a socket which is a portion of a sphere fitting around a mating spherical projection on the metal bearing part. Therefore, the metal bearing part can pivot in all directions a limited amount to properly align itself with the shaft on which it is journaled.

The interlocking projections are sized and shaped so that they do not interfere with said self-aligning so that they do not interfere with said self-aligning movement even though they function to provide a mechanical connection preventing relative rotation between the sleeve and the bearing part. Further, the flared end engages the wall of the bore of the brush body in a manner which prevents relative rotation between the sleeve and the brush body.

With this structure, the sleeve functions to lock the bearing part and the brush body together against relative rotation so wear does not occur and the bearing operates properly for extended periods of time. Further, since a tight engagement between the sleeve socket and the spherical projection on the bearing part is not required to prevent relative rotation therebetween, the very close manufacturing tolerances are not required. Therefore, a more reliable assembly is provided at lower cost, even when the bearing is mounted within a body which expands and contracts in use.

These and other aspects of this invention are illustrated in the accompanying drawings and are more fully described in the following specification.

DETAILED DESCRIPTION OF THE DRAWINGS

Figure 1:
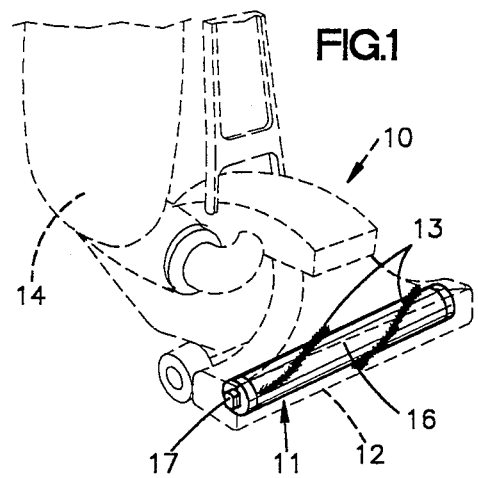
FIG. 1 is a schematic illustration of an upright vacuum cleaner incorporating a brush journaled on bearings in accordance with the present invention.

FIG. 1 is a schematic illustration of a typical upright vacuum cleaner 10 having a powered rug agitating brush assembly 11 mounted therein. Such a vacuum cleaner provides a fan (not illustrated) which draws air into the vacuum cleaner through a nozzle 12 in which the brush assembly 11 is mounted. Such brush assembly is typically provided with spirally arranged brushes or beater bars 13 which engage a carpet being cleaned and agitate the surface thereof and loosen dirt so that it can be drawn into the nozzle by the air passing through the nozzle. Subsequently, the dirt-laden air is discharged into a filter bag, schematically illustrated at 14, in which the dirt is collected.

Generally, the brushes or beater bars 13 are positioned along the length of the brush, but are spaced from each other at the center of the brush 16 so that a belt (not illustrated) powered by the vacuum cleaner motor rotates the brush assembly about its longitudinal axis. Further, the brush assembly is typically provided with providing mounting portions 17 at each end of the brush which snap into a suitable mounting clip within the nozzle to support the brush within the nozzle. The mounting portions 17 are mounted on the ends of a shaft 18 which extends through a tubular body 19 on which the brushes or beater bars 13 are mounted. The shaft is held against rotation within the nozzle 12 by the mounting portions 17, and is therefore fixed against rotation when the brush assembly 11 rotates.

In order to journal the brush assembly for rotation relative to the shaft 18, a bearing assembly 21 is provided at each end of the tubular body 19. Such bearing assemblies 21 are identical but opposite, so only one bearing assembly is described in detail and illustrated in the drawings. However, it should be understood that identical but oppositely facing bearing assemblies 21 are mounted at each end of the body 19.

Figure 3:
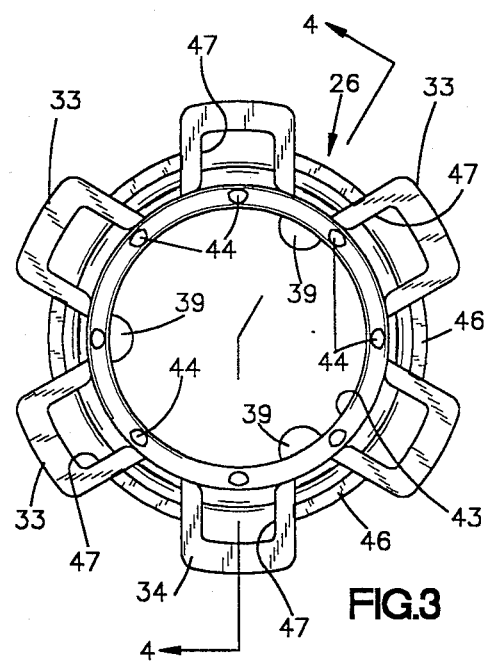
FIG. 3 is an end view of the plastic sleeve in its as-molded condition.
Figure 4:
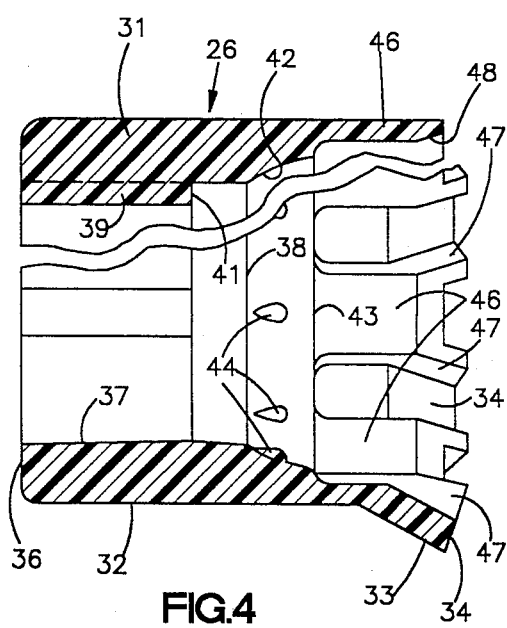
FIG. 4 is a side elevation in longitudinal section of the sleeve illustrated in FIG. 3, taken along line 4—4 of FIG. 3.
Figure 5:
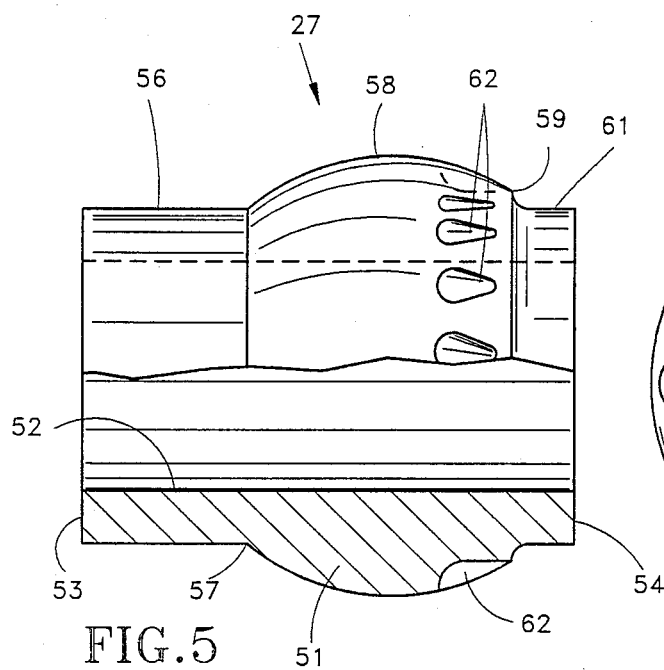
FIG. 5 is a side elevation of the metal bearing part.
Figure 6:
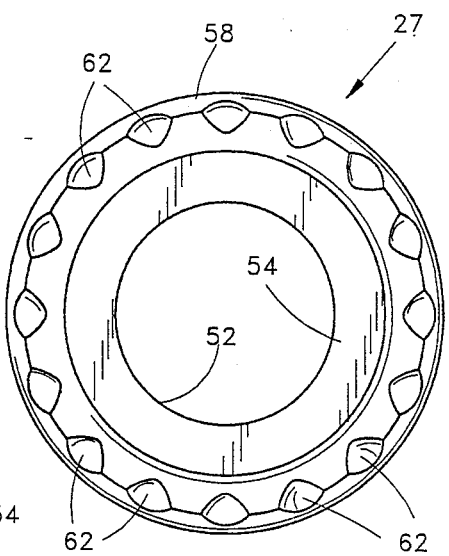
FIG. 6 is an end elevation of the metal bearing part.

Each of the bearing assemblies 21 includes a molded plastic sleeve 26, illustrated in FIGS. 3 and 4 in the as-molded condition, and a metal bearing part 27, illustrated in FIGS. 5 and 6 prior to its assembly within the sleeve 26 and prior to the mounting of the sleeve 26 and bearing part 27 in the brush body 19.

The sleeve 26 is preferably molded from a plastic material, such as nylon, and provides a tubular body 31 having a cylindrical outer surface 32 with a plurality of outwardly flared, peripherally spaced portions 33 adjacent to one end 34. Extending from the other end 36, the body provides a central axial passage 37 extending to approximately the midpoint of the sleeve at 38.

Peripherally spaced around the passage 37 are three similar axially extending ribs 39, best illustrated in FIG. 3. The ribs 39 extend to a location 41 spaced back from the end 38 of the axial passage 37. Extending forward from the location 38, the body provides a spherical portion 42 which extends with increasing diameter toward the first end 34 to the axial position 43. Peripherally spaced around the spherical portion 42 are a plurality of small teardrop-shaped projections 44. In the illustrated embodiment, there are eight peripherally spaced projections 44 symmetrically arranged around the axis of the sleeve 26.

Between the axial position 43 and the first end 34 of the sleeve are a plurality of peripherally spaced, axially extending wall portions 46 interposed between the flared portions 33, as best illustrated in FIG. 4. Inwardly directed wall portions 47 extend generally radially and interconnect the adjacent edges of the flared portions 34 and the wall portions 46. The ends of the wall portions 46 are beveled at 48. As best illustrated in FIG. 4, the ends of the inwardly extending wall portions 47 extend axially a small distance beyond the ends of the wall portions 46. Except for the existence of the teardrop projections 44, the sleeve 26, in accordance with the present invention, is substantially identical in structure to that described in U.S. Pat. 3,367,728, supra.

The metal bearing 27 has a structure best illustrated in FIGS. 5 and 6, and provides a metal body 51 having an axial bore 52 therein extending from one end 53 of the body to the other end 54 of the body. The bore 52 is sized to closely fit the exterior of the shaft 18 and provide a journal with respect to such shaft.

The bearing 27 also provides a cylindrical outer surface 56 extending from the end 53 to a location 57 where it intersects a spherical surface portion 58 having a radius of curvature substantially identical to the radius of curvature of the spherical portion 42. The spherical surface portion 58 extends from the location 57 to a location 59, where it is radiused into a cylindrical surface portion 61 extending to the end 54. Peripherally spaced around the end of the spherical portion 58 adjacent to the end 54 are a plurality of teardrop-shaped recesses 62 which are sized to receive and interfit with the teardrop-shaped projections 44 of the sleeve.

In the illustrated embodiment, there are sixteen recesses 62 symmetrically arranged around the axis of the metal bearing. Such recesses are sized and shaped so that they are closely spaced from the adjacent recess on either side, as best illustrated in FIG. 6. In this illustrated embodiment, there are twice as many recesses as projections, so when the metal bearing is inserted into the sleeve, a teardrop-shaped projection 44 extends into every other recess. It should be understood, however, that within the broader scope of this invention, an equal number of recesses and projections can be provided, respectively, on the metal bearing and the sleeve, or the number of recesses can exceed the number of projections by more than two. The number of recesses, however, must equal at least the number of projections so that a recess is provided to receive each of the projections.

During the assembly of the bearing assembly 21, the metal bearing 27 is inserted into the flared end of the sleeve 26, with the end 54 extending into the sleeve 26. Because the recesses are closely spaced and because of the teardrop-shaped, curved configuration of the projections, the bearing and sleeve automatically orient themselves so that each projection 44 extends into an associated recess 62.

It has been found that with the illustrated structure, automatic orientation to provide interfitting engagement between the recesses and projections occurs even if the metal bearing 27 is oriented so that the recesses and projections are not exactly aligned during assembly.

In effect, the projections cam the two parts in a rotational direction so as to automatically establish the proper orientation between the sleeve 26 and bearing to provide interfitting contact between the projections 44 and the recesses 52. Therefore, automated assembly equipment which assembles the bearing and sleeve need not be constructed to establish any particular rotational orientation during assembly.

Because the flared end of the sleeve is provided, the metal bearing can be inserted into the sleeve without interference. After the sleeve and metal bearing are assembled as a subassembly, the end of the spherical surface portion 58 adjacent to the end 54 fits against the spherical surface portion 42 in the sleeve to limit inward movement of the bearing relative to the sleeve.

Figure 2:
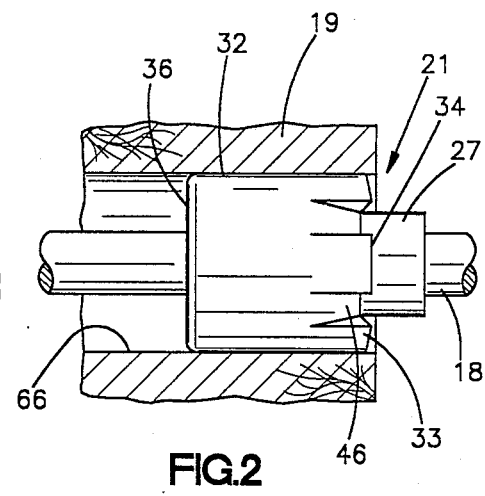
FIG. 2 is an enlarged, fragmentary view of one end of the vacuum cleaner brush partially in section to illustrate one of the journal bearings mounted therein.
Figure 7:
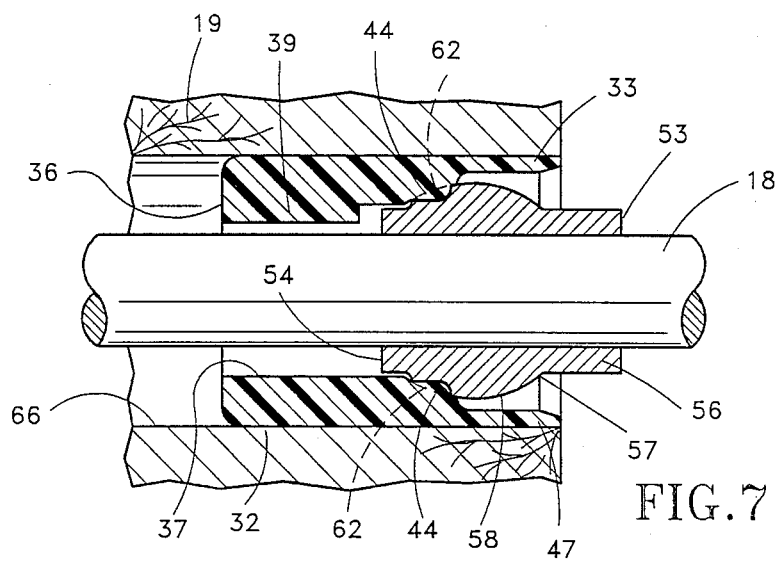
FIG. 7 is a cross section of an installed bearing.
Figure 8:
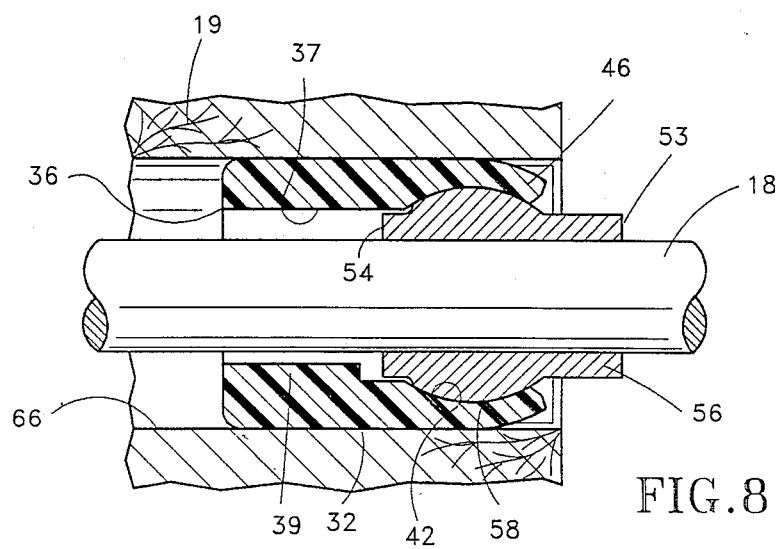
FIG. 8 is another cross section of the installed bearing.

The subassembly, including the sleeve 26 and bearing 27, is then pressed axially into the end of an axial bore 66 formed in the body 19 of the brush 11 to the position illustrated in FIG. 2. The bore 66 is sized to closely fit the cylindrical surface 32 of the sleeve. During the insertion of the subassembly into the bore 36, the flared portions 33 are deflected inwardly by the engagement with the surface of the bore 66, as illustrated in FIGS. 2 and 7, so that they are aligned with the cylindrical surfaces 32. Such inward deflection of the flared portions causes the inwardly extending wall portions 47 to deflect the wall portions 46 into engagement with the part of the spherical surface 58 remote from the end 54 to produce a spherical socket within the sleeve which encloses the spherical surface 58 to provide a structure in which the bearing can swivel a small amount in all directions with respect to the sleeve to a position in which it is in alignment with the shaft 18. The projections 44, being small and formed of a deformable material, do not prevent such self-aligning, swiveling movement of the bearing. However, they provide a mechanical interlocking connection with prevents rotation of the bearing relative to the sleeve around the axis of the bearing system. Preferably, the number of projections 44 is less than the number of recesses 62 so that a large number of projections do not resist the swiveling movement of the bearing part 27. However, a sufficient number of symmetrically arranged projections should be provided to give sufficient mechanical interlocking strength in all swivel positions of the bearing part 27. The projections 44 need not be as closely spaced as the recess 62 to provide the automatic rotational alignment described above.

Because a positive mechanical interlocking connection is provided by the projection 44 and the recesses 62, it is not necessary to depend upon a tight fit between the bearing and the sleeve to prevent relative rotation therebetween. Consequently, the parts do not have to be made to extremely close tolerances. Further, in many instances, the brush body 19 is formed of wood or other material which tends to be difficult to manufacture to close tolerances. Since the mechanical interlock prevents the relative rotation between the sleeve and the bearing, to tolerances of the bore 66 need not be maintained extremely close.

Further, wood tends to expand and shrink with temperature and humidity changes. However, because the mechanical interlock is provided, such expansion or shrinkage in the body 19 does not change the fit a sufficient amount to allow wear-producing relative rotation to occur between the bearing and the plastic sleeve.

The flared portions 33 function also to interlock with the surface of the bore 66 at peripherally spaced locations so that the sleeve is held against rotation relative to the body, even when the body 19 expands or shrinks during use. When the body shrinks and reduces the diameter of the bore 66, the flared portions merely deflect inwardly a corresponding amount. When the body expands and increases the diameter of the bore 66, the flared portions also expand to maintain their locking engagement with the surface of the bore.

With this invention, a simple, low-cost, self-aligning bearing system is provided in which extremely close tolerances need not be maintained during manufacture. Further, automatic rotational orientation of the sleeve and metal bearing occurs during assembly so that automated assembly equipment can be used without difficulty. Additionally, a reliable structure is provided which will continue to function properly without wear, even when the bearing assembly is installed within a body which is subject to expansion and contraction during use.

Although the preferred embodiment of this invention has been shown and described, it should be understood that various modifications and rearrangements of the parts may be resorted to without departing from the scope of the invention as disclosed and claimed herein.

What is claimed is:

1. A rotary vacuum cleaner brush comprising a tubular cylinder body having carpet agitating means along the exterior thereof, bearing means at each end of said body adapted to support and journal said body in a vacuum cleaner for rotation of said body about the axis thereof, said bearing means each including a sleeve formed of deformable material and a bearing insert providing a through-bore, a shaft in said through-bore journaling said bearing insert, said bearing insert providing an outer surface having an outer spherical portion, said sleeve providing an interior having an inner spherical socket portion mating with said outer spherical portion supporting said bearing insert within said sleeve for limited relative swiveling movement so that said insert moves into alignment with said shaft, said sleeve and bearing insert providing interfitting projections and recesses preventing relative rotation therebetween around the axis of said body, said recesses being peripherally spaced around said axis at sufficiently close intervals and said recesses and projections being shaped to cause automatic mating engagement with said projections when said bearing insert is assembled in said sleeve regardless of initial rotational orientations of the sleeve and bearing insert during assembly.

2. A vacuum cleaner brush as set forth in claim 1, wherein said projections and recesses are curved and operate to cam said sleeve and bearing parts to rotationally orient them for said mating engagement.

3. A vacuum cleaner brush as set forth in claim 2, wherein said bearing part is formed of metal, and said sleeve is formed of molded plastic.

4. A vacuum cleaner brush as set forth in claim 2, wherein said projections and recesses are located on said inner and outer spherical portions.

5. A vacuum cleaner brush as set forth in claim 4, wherein the number of said recesses is at least two times the number of said projections.

6. A vacuum cleaner brush as set forth in claim 5, wherein said recesses are formed on said bearing part and said projections are formed on said sleeve.

7. A vacuum cleaner brush as set forth in claim 6, wherein said body is formed of a material which expands and contracts in use.

8. A vacuum cleaner brush as set forth in claim 7, wherein said body is formed of wood.

9. A self-aligning bearing for journaling a body having a cylindrical bore therein on a shaft, comprising a sleeve formed of deformable material having an axis, said sleeve providing an axial passage therein open at the ends of said sleeve, said passage providing an axially facing spherically shaped socket portion extending with increased diameter toward one of said ends and a flared portion at said one end, said bearing also providing a bearing insert adapted to be journaled on said shaft, said bearing insert providing a spherical outer surface sized to mate with said socket portion, said flared portion deflecting inwardly when said sleeve is positioned in said bore to form in cooperation with said socket portion a socket engaging said spherical outer surface and axially positioning said bearing insert in said sleeve while allowing swiveling movement therebetween, said sleeve and bearing providing a plurality of symmetrically arranged peripherally spaced projections and recesses which interfit to prevent relative rotation between said bearing insert and said sleeve, said recesses being sufficiently closely spaced and said recesses and projections being shaped to automatically rotationally cam said sleeve and bearing insert to a proper rotational orientation for mating engagement between said projections and recesses when said bearing insert is assembled in said sleeve regardless of initial rotational orientations of said sleeve and said bearing insert during assembly.

10. A self-aligning bearing as set forth in claim 9, wherein said bearing insert is formed of metal and said sleeve is formed of deformable plastic.

11. A self-aligning bearing as set forth in claim 10, wherein the number of said recesses is equal to at least twice the number of projections.

12. A self-aligning bearing as set forth in claim 11, wherein said projections are formed in said sleeve and said recesses are formed in said bearing insert.

* * * * *